United States Patent
Huang et al.

(10) Patent No.: US 9,614,940 B2
(45) Date of Patent: Apr. 4, 2017

(54) HANDHELD ELECTRONIC PRODUCT

(71) Applicant: Huawei Device Co., Ltd., Shenzhen (CN)

(72) Inventors: Bo Huang, Shanghai (CN); Haitao Duan, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 104 days.

(21) Appl. No.: 14/586,148

(22) Filed: Dec. 30, 2014

(65) Prior Publication Data

US 2015/0111625 A1    Apr. 23, 2015

Related U.S. Application Data

(63) Continuation of application No. PCT/CN2013/077440, filed on Jun. 19, 2013.

(30) Foreign Application Priority Data

Jan. 7, 2013  (CN) .......................... 2013 1 0004885

(51) Int. Cl.
*H04M 1/00* (2006.01)
*H04M 1/02* (2006.01)
(Continued)

(52) U.S. Cl.
CPC ........ *H04M 1/0202* (2013.01); *G06F 1/1626* (2013.01); *G06F 1/1637* (2013.01);
(Continued)

(58) Field of Classification Search
CPC .. G06F 1/1626; G06F 1/1637; H04M 1/0202; H04M 1/0249; H04M 1/0266; H04M 1/185

See application file for complete search history.

(56) References Cited

U.S. PATENT DOCUMENTS 5,583,742 A    12/1996  Noda et al.
9,148,972 B2    9/2015  Yeates
(Continued)

FOREIGN PATENT DOCUMENTS

CN    201054720 Y    4/2008
CN    201491423 U    5/2010
(Continued)

OTHER PUBLICATIONS

Partial English Translation and Abstract of Japanese Patent Application No. JP3088056, Jan. 29, 2016, 14 pages.
(Continued)

*Primary Examiner* — Xin Jia
(74) *Attorney, Agent, or Firm* — Conley Rose, P.C.

(57) ABSTRACT

A handheld electronic product comprising a square housing, where four corners of the housing are provided with bezels, and the left side and the right side of the housing have no bezels, a glass cover is built into the housing in a retracted manner, the rear surface of the glass cover is connected to the housing, and the bezels provided at the four corners of the housing are higher than the rear surface of the glass cover. Embodiments of the present invention can reduce a width of the handheld electronic product and assembly procedures.

19 Claims, 4 Drawing Sheets

(51) Int. Cl.
  *G06F 1/16*  (2006.01)
  *H04M 1/18*  (2006.01)
(52) U.S. Cl.
  CPC ....... *H04M 1/0249* (2013.01); *H04M 1/0266* (2013.01); *H04M 1/185* (2013.01)

(56) References Cited

U.S. PATENT DOCUMENTS

| | | |
|---|---|---|
| 2009/0168402 A1 | 7/2009 | Liu |
| 2010/0245234 A1 | 9/2010 | Park et al. |
| 2011/0006925 A1 | 1/2011 | Cheng et al. |
| 2011/0019123 A1* | 1/2011 | Prest .............. C03C 19/00 349/58 |
| 2012/0155035 A1* | 6/2012 | Chen ............... G06F 1/1626 361/728 |
| 2012/0194997 A1* | 8/2012 | McClure .......... G06F 1/1626 361/679.55 |
| 2014/0254073 A1 | 9/2014 | Yeates |
| 2015/0108030 A1 | 4/2015 | Yin |

FOREIGN PATENT DOCUMENTS

| | | | |
|---|---|---|---|
| CN | 102638954 | A | 8/2012 |
| CN | 202475529 | U | 10/2012 |
| CN | 202565333 | U | 11/2012 |
| CN | 202615076 | U | 12/2012 |
| CN | 103078974 | A | 5/2013 |
| EP | 2775376 | A1 | 9/2014 |
| JP | H07168646 | A | 7/1995 |
| JP | 3055046 | U | 12/1998 |
| JP | 3088056 | B2 | 9/2000 |
| JP | 2014099686 | A | 5/2014 |
| KR | 20100036365 | A | 4/2010 |
| WO | 2010027565 | A2 | 3/2010 |

OTHER PUBLICATIONS

Partial English Translation and Abstract of Japanese Patent Application No. JP2014-099686, Jan. 29, 2016, 11 pages.
Partial English Translation and Abstract of Japanese Patent Application No. JP3055046, Jan. 29, 2016, 10 pages.
Foreign Communication From a Counterpart Application, Japanese Application No. 2015-523385, Japanese Office Action dated Dec. 1, 2015, 5 pages.
Foreign Communication From a Counterpart Application, Japanese Application No. 2015-523385, English Translation of Japanese Office Action dated Dec. 1, 2015, 6 pages.
Foreign Communication From a Counterpart Application, Korean Application No. 10-2015-7003017, Korean Office Action dated Dec. 14, 2015, 5 pages.
Foreign Communication From a Counterpart Application, Korean Application No. 10-2015-7003017, English Translation of Korean Office Action dated Dec. 14, 2015, 3 pages.
Partial English Translation and Abstract of Chinese Patent Application No. CN202475529U, Oct. 14, 2014, 6 pages.
Partial English Translation and Abstract of Chinese Patent Application No. CN202565333U, Oct. 14, 2014, 9 pages.
Partial English Translation and Abstract of Chinese Patent Application No. CN103078974A, Feb. 4, 2014, 4 pages.
Partial English Translation and Abstract of Chinese Patent Application No. CN201054720Y, Feb. 4, 2015, 7 pages.
Partial English Translation and Abstract of Chinese Patent Application No. CN202615076U, Feb. 4, 2015, 21 pages.
Foreign Communication From a Counterpart Application, Chinese Application No. 201310004885.8, Chinese Office Action dated Sep. 26, 2014, 5 pages.
Foreign Communication From a Counterpart Application, Chinese Application No. 201310004885.8, Chinese Search Report dated Sep. 19, 2014, 2 pages.
Foreign Communication From a Counterpart Application, PCT Application No. PCT/CN2013/077440, English Translation of International Search Report dated Oct. 17, 2013, 2 pages.
Foreign Communication From a Counterpart Application, PCT Application No. PCT/CN2013/077440, Written Opinion dated Oct. 17, 2013, 5 pages.
Foreign Communication From a Counterpart Application, European Application No. 13870066.1 Extended European Search Report dated Oct. 27, 2015, 7 pages.
Foreign Communication From a Counterpart Application, Korean Application No. 10-2015-7003017, Korean Notice of Rejection dated Jun. 24, 2016, 3 pages.
Foreign Communication From a Counterpart Application, Korean Application No. 10-2015-7003017, English Translation of Korean Notice of Rejection dated Jun. 24, 2016, 2 pages.

* cited by examiner

HANDHELD ELECTRONIC PRODUCT

CROSS-REFERENCE TO RELATED APPLICATIONS

This application is a continuation of International Application No. PCT/CN2013/077440, filed on Jun. 19, 2013, which claims priority to Chinese Patent Application No. 201310004885.8, filed on Jan. 7, 2013, both of which are hereby incorporated by reference in their entireties.

TECHNICAL FIELD

The present invention relates to the communications and electronic product field, and in particular, to a handheld electronic product.

BACKGROUND

As a screen of a handheld electronic product (for example, a mobile phone, or a tablet computer) is being designed larger, overall dimensions of the product also become larger. However, an excessively large width of a product makes it inconvenient for a user to hold and operate the product.

A size of a housing around a glass cover of a handheld product has a great effect on a size of the product itself. For example, as shown in FIG. 1, 001 is a glass cover of a touch panel (TP), 002 is a plastic buffer ring of a front housing, 003 is a housing (for example, metal or plastic), and 004 is an adhesive material. It can be learned from the figure that there is one plastic buffer ring on an outer edge of the glass cover, and then the housing. On the outer edge of the glass cover, widths of the plastic buffer ring and the housing need to be increased, which increases a size from a display area to an edge of the overall product, and further increases a width of the overall product. Moreover, a plurality of objects, such as the glass cover, the plastic buffer ring of the front housing, and the housing need to be assembled, which involves many assembly procedures and considerable detachable parts. For another example, the glass cover may be directly bonded to a plastic front housing, and the front housing requires a plastic material around the glass cover, which increases a size from the display area to the outline of the overall product, and further increases the width of the overall product.

Therefore, how to reduce the width of a handheld electronic product and reduce assembly procedures is an urgent problem to be resolved by major manufacturers.

SUMMARY

Embodiments of the present invention provide a handheld electronic product that has a smaller width and fewer assembly procedures.

According to a first aspect, a handheld electronic product is provided, where the handheld electronic product includes a glass cover and a housing, where the housing is a square housing, four corners of the housing are provided with bezels, and the left side and the right side of the housing have no bezels; and the glass cover is built into the housing in a retracted manner, the rear surface of the glass cover joins with the housing, and the bezels provided at the four corners of the housing are higher than the rear surface of the glass cover.

With reference to the first aspect, in a first possible implementation manner of the first aspect, the top end and the bottom end of the housing have bezels, and the bezels of the top end and the bottom end join with the bezels provided at the four corners.

With reference to the first aspect or the first possible implementation manner of the first aspect, in a second possible implementation manner of the first aspect, the four corners of the housing are all arc chamfers, and the bezels provided at the four corners of the housing are all arc bezels, where a height of the bezels provided at the four corners gradually increases from the bottom, at which an arc chamfer joins with the left side and the right side of the housing, to a middle point of the arc chamfer, so that the height reaches its peak at the middle point.

With reference to the first aspect, the first possible implementation manner of the first aspect, or the second possible implementation manner of the first aspect, in a third possible implementation manner of the first aspect, the left and the right side of the glass cover separately retract into the housing by 0.1 millimeter (mm) to 0.5 mm.

With reference to the first aspect, the first possible implementation manner of the first aspect, the second possible implementation manner of the first aspect, or the third possible implementation manner of the first aspect, in a fourth possible implementation manner of the first aspect, the highest point of the bezels of the housing is 0.1 mm to 0.3 mm higher than the glass cover.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, there is a gap of 0.02 mm to 0.2 mm between the bezels of the housing and the glass cover.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the handheld electronic product is a mobile phone.

Therefore, a handheld electronic product according to embodiments of the present invention includes a glass cover and a housing, where the left side and the right side of the glass cover are not surrounded by bezels of the housing, and the glass cover is built into the housing in a retracted manner, which can reduce a width of an overall product, and mitigate impact on the glass cover when the product falls by the side; and bezels are provided at four corners of the housing, which can further migrate external impact by bezel structures at the four corners, thereby providing good impact protection for the glass cover. In addition, no plastic buffer ring is provided between the housing and the glass cover, which can reduce assembly processes and materials, thereby reducing costs.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

A handheld electronic product according to embodiments of the present invention may be a tablet computer, a mobile phone, a game console, or the like. A mobile phone is shown in the accompanying drawings, but the embodiments set no limitation thereto.

The left side and the right side of a housing in the embodiments of the present invention refer to the left side and the right side of the housing when the electronic product is normally held, and the top end and the bottom end of the housing refer to the top end and the bottom end of the housing when the electronic product is normally held. If the electronic product has a rotatable function, the left side, the right side, the top end, and the bottom end of the housing refer to the left side, the right side, the top end, and the bottom end of the housing when the electronic product is used in a state in compliance with use habits of most consumers.

The handheld electronic product in the embodiments of the present invention includes other parts in addition to a glass cover, the housing, and bezels provided on the housing. For brevity, details are not described herein again.

Figure 1:
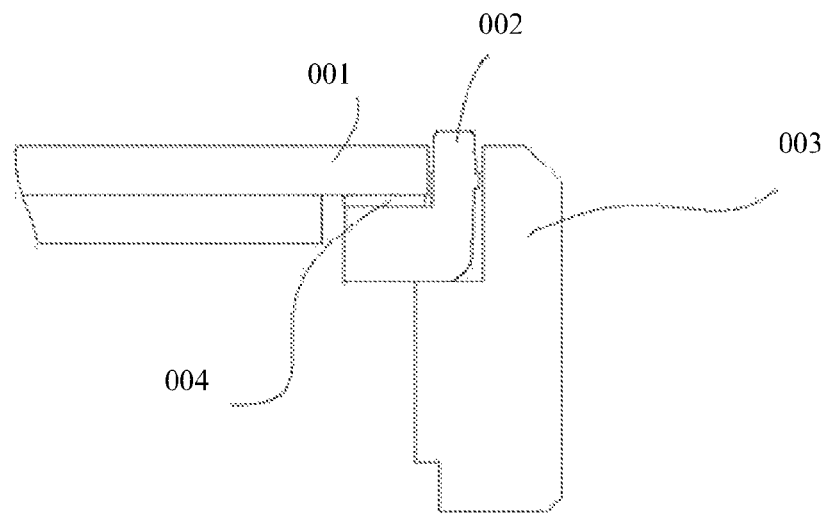
FIG. 1 is a schematic structural diagram of a handheld electronic product according to the prior art.
Figure 2:
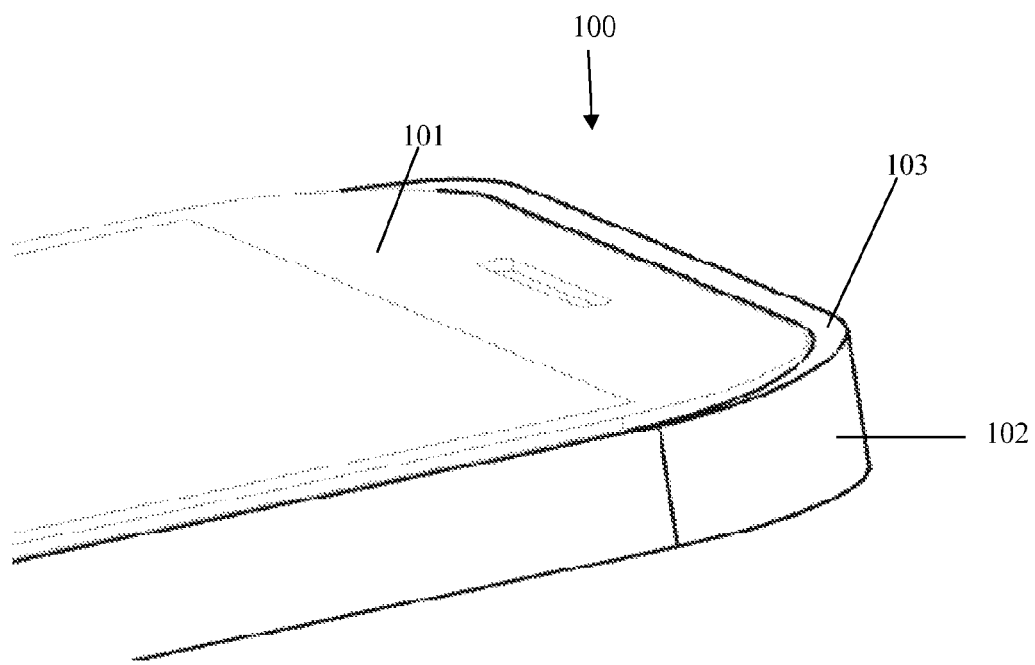
FIG. 2 is a schematic structural diagram of a handheld electronic product according to an embodiment of the present invention.

FIG. 2 is a schematic structural diagram of a handheld electronic product 100 according to an embodiment of the present invention. As shown in FIG. 2, the handheld electronic product includes a glass cover 101 and a housing 102, where the housing 102 is a square housing, bezels 103 are provided at four corners of the housing 102, and the left side and the right side of the housing 102 have no bezels; and the glass cover 101 is built into the housing 102 in a retracted manner, the rear surface of the glass cover 101 joins with the housing 102, for example, the rear surface of the glass cover 101 is bonded to the housing 102 by bonding, and the bezels provided at the four corners of the housing 102 are higher than the rear surface of the glass cover 101.

The housing according to this embodiment of the present invention may be a front housing of the electronic product, a glass cover may be built into the upper surface of the front housing, and a rear housing or a battery cover may be connected to the lower surface of the front housing; the housing may also be the only housing of the electronic product, a glass cover is built into the upper part of the housing, and the lower part of the housing accommodates other parts of the product, such as a chip and a battery. The bezels according to this embodiment of the present invention are a part of the housing, which may be integrally molded with other parts of the housing, or may be connected to other parts of the housing by bonding. When the glass cover is built into the housing and the rear surface of the glass cover is bonded to the housing, the bezels can overtop the rear surface of the glass cover.

Figure 3:
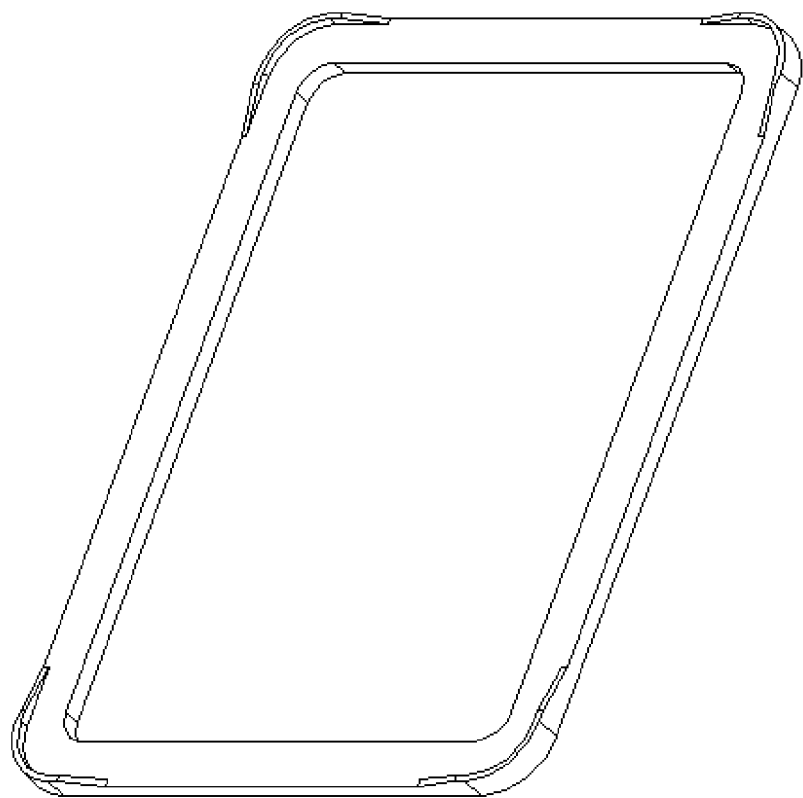
FIG. 3 is a schematic structural diagram of a housing according to an embodiment of the present invention.

FIG. 3 shows a schematic structural diagram of a housing according to this embodiment of the present invention. It can be learned from the figure that, four round chamfers of the housing are provided with bezels, other parts of the housing except the four bezels are of a hollow plate structure, and the rear surface of a glass cover may be bonded to the upper surface of the plate. It should be understood that FIG. 3 shows only a front housing according to this embodiment of the present invention, and the housing according to this embodiment of the present invention may also be a front housing or a rear housing of other structures, which is not limited in this embodiment of the present invention.

It should be understood that, in this embodiment of the present invention, that the left side and the right side of the housing 102 have no bezels means that the left side and the right side of the glass cover 101 are not surrounded by the bezels of the housing 102. In this embodiment of the present invention, the left side and the right side of the glass cover 101 may separately retract into the housing by 0.1 mm to 0.5 mm, for example, a distance between the left edge of the glass cover 101 and the left edge of the corresponding housing 102 is 0.1 mm to 0.5 mm.

In this embodiment of the present invention, the bezels 103 provided at the four corners of the housing 102 is higher than the rear surface of the glass cover 101; therefore, impact on the glass cover 101 can be further reduced when the electronic product falls. In this embodiment of the present invention, the bezels 103 provided at the four corners of the housing 102 may be lower than, parallel to, or higher than the front surface of the glass cover 101. For example, the highest point of the bezels 103 provided at the four corners of the housing 102 is higher than the glass cover 101, or all the bezels 103 are higher than the glass cover 101. For example, the highest point of the bezels provided at the four corners of the housing 102 is 0.1 mm to 0.3 mm higher than the glass cover.

In this embodiment of the present invention, the four corners of the housing 102 are all arc chamfers, and the bezels provided at the four corners of the housing are all arc bezels, where a height of the bezels provided at the four corners of the housing gradually increases from the bottom, at which an arc chamfer joins with the left side and the right side of the housing, to an middle point of the arc chamfer, so that the height reaches its peak at the middle point. In this way, the height of the bezels changes smoothly, making the electronic product more aesthetic. For example, the bezels at the bottom of the arc bezels on the left side and the right side of the electronic product is parallel to the rear surface of the glass cover, and the bezel at the middle point is 0.1 mm to 0.3 mm higher than the glass cover 101.

In this embodiment of the present invention, there is a gap between the bezels 103 provided at the four corners of the housing 102 and the glass cover 101, for example, a gap of 0.02 mm to 0.2 mm.

Figure 4A:
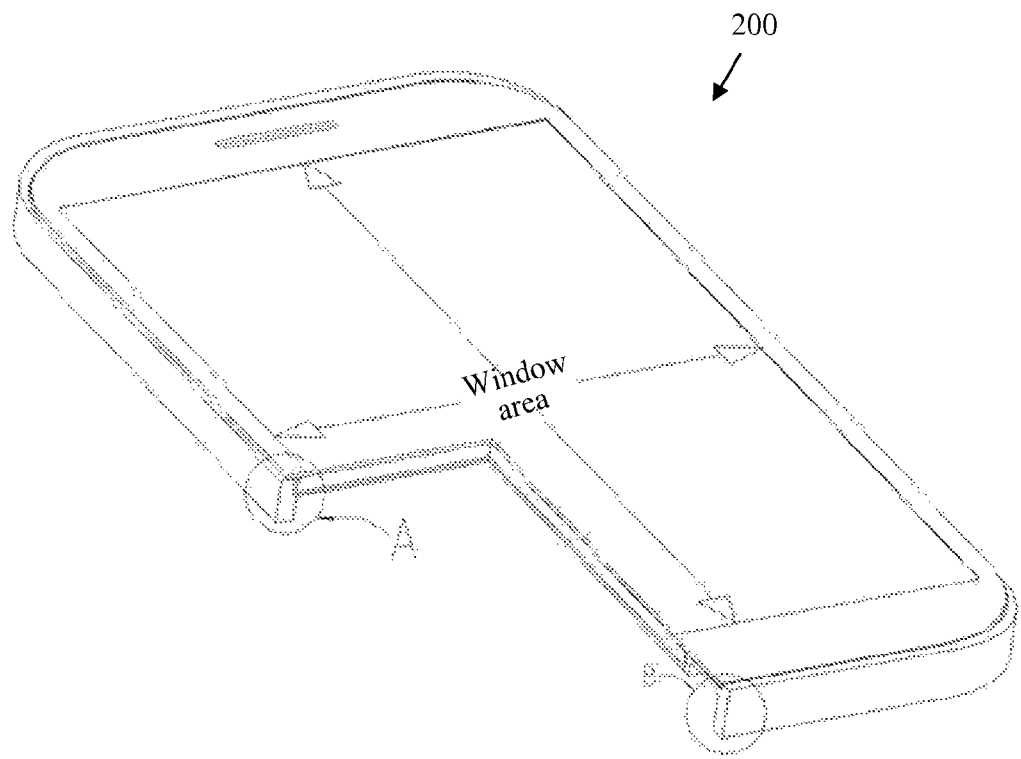
FIG. 4A is a schematic structural diagram of a handheld electronic product according to another embodiment of the present invention.

In this embodiment of the present invention, the bezels 103 may also be provided at the top end and the bottom end of the housing 102; the bezels 103 at the top end and the bottom end are connected to the bezels 103 provided at the four corners. For example, as shown in FIG. 3, the top end and the bottom end of the housing 102 are provided with the bezels 103, where a height of the bezels 103 at the top end and the bottom end may be consistent with the height of the bezels 103 at the middle point of the arc chamfer; the utmost edge of the bezels 103 at the top end and the bottom end may be lower than, parallel to, or higher than the glass cover 101, and decreases gradually towards the glass cover 101; where the height at the lowest point of the bezels 103 may be parallel to the height of the rear surface of the glass cover 101, and there may be a gap of 0.02 mm to 0.2 mm between the bezels 103 and the glass cover 101. For ease of understanding, the following gives a detailed description with reference to FIG. 4A to FIG. 4C. FIG. 4A shows a schematic structural diagram of a handheld electronic product 200 according to an embodiment of the present invention, where the handheld electronic product 200 includes a glass cover 201, a housing 202, and bezels 203 provided on the housing.

Figure 4B:
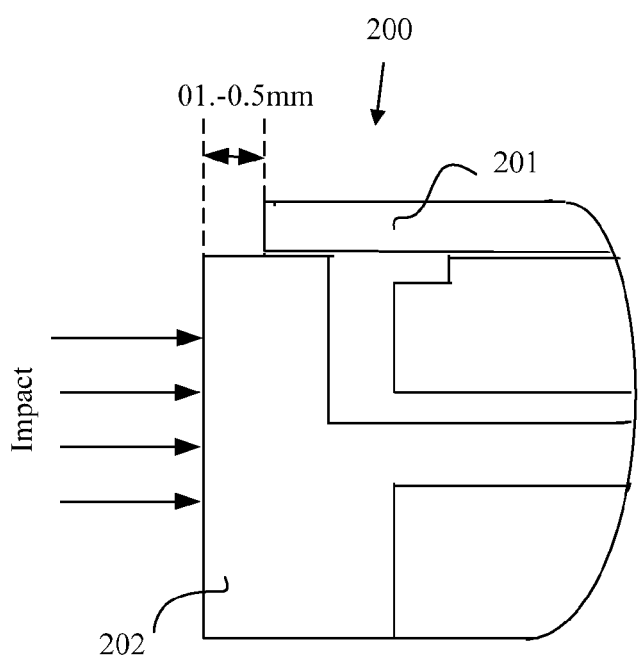
FIG. 4B is a partial cross-sectional view of the handheld electronic product shown in FIG. 4A.

FIG. 4B is a detailed view of a cross-sectional area of A in FIG. 4A, where A is on the left side or the right side of the electronic product 200. It can be seen from the figure that, no bezel is provided for the housing 202 in an area corresponding to the outer side of the glass cover 201 in A, and the glass cover 201 in this area retracts into the housing 202 by a certain distance, for example, 0.1 mm to 0.5 mm shown in the figure; therefore, as can be seen, a width of the product here is quite small. In addition, impact on the glass cover 201 can be mitigated when the product falls by the side as the glass cover 201 retracts into the housing 202 by a certain distance.

Figure 4C:
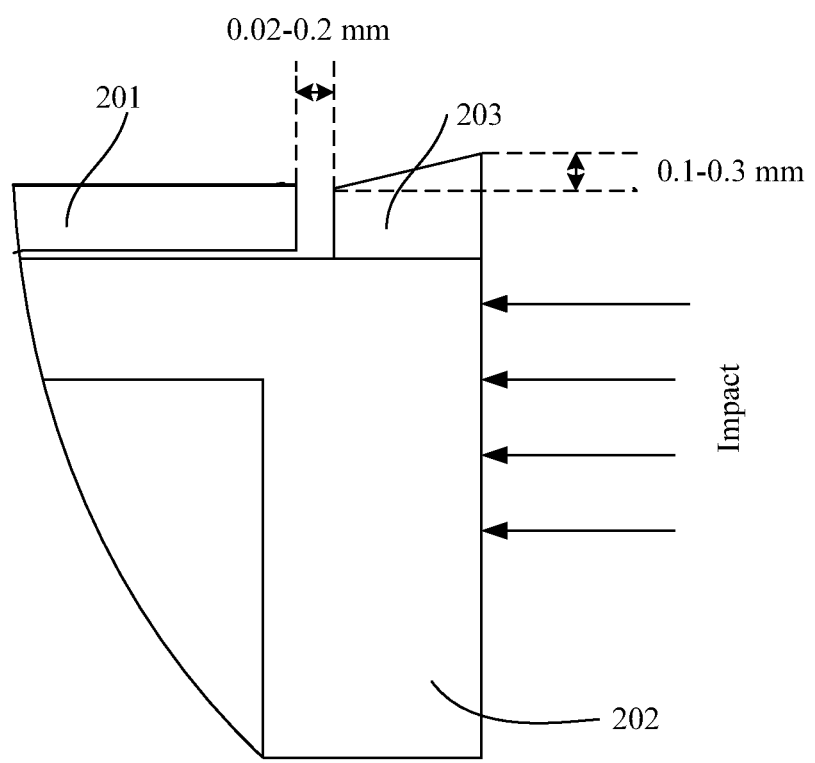
FIG. 4C is a partial cross-sectional view of the handheld electronic product shown in FIG. 4A.

FIG. 4C is a detailed view of a cross-sectional area of B in FIG. 4A, where B is at the top end or the bottom end of the electronic product 200. It can be seen from the figure that, the bezel 203 is provided for the housing 202 in an area corresponding to the outer side of the glass cover 201 in B, and there is a gap between the bezel 203 and the glass cover 201, for example, 0.02 mm to 0.2 mm shown in the figure; the highest point of the bezel may be higher than the upper surface of the glass cover, for example, 0.1 mm to 0.3 mm above the upper surface; and the bezel here is bonded to a hollow plate-like structure of the housing; certainly, the bezel may also be integrally molded with the hollow plate-like structure. The top end and the bottom end are provided with bezels 203; however, because the top end and the bottom end are not frequently-used holding parts, bezels provided at the top end and the bottom end can better improve impact resistance of the electronic product. The gap at the top end and the bottom end can mitigate impact on the glass cover and facilitate assembly.

Therefore, a handheld electronic product according to an embodiment of the present invention includes a glass cover and a housing, where the left side and the right side of the glass cover are not surrounded by bezels of the housing, and the glass cover is built into the housing in a retracted manner, which can reduce a width of an overall product, and mitigate impact on the glass cover when the product falls by the side; and bezels are provided at four corners of the housing, which can further migrate external impact by bezel structures at the four corners, thereby providing good impact protection for the glass cover. In addition, no plastic buffer ring is provided between the housing and the glass cover, which can reduce assembly processes and materials, thereby reducing costs.

The present invention is described in detail with reference to the accompanying drawings and in combination with the exemplary embodiments, but the present invention is not limited thereto. Various equivalent modifications or replacements can be made to the embodiments of the present invention by a person of ordinary skill in the art without departing from the spirit and essence of the present invention, and the modifications or replacements shall fall within the scope of the present invention.

What is claimed is:

1. A handheld electronic product, comprising:
a glass cover having a front surface and a rear surface; and
a housing comprising a top end and a bottom end,
wherein the housing is a square housing,
wherein four corners of the housing are provided with bezels,
wherein the bezels are disposed only at the top end and the bottom end of the housing,
wherein the glass cover is built into the housing in a retracted manner,
wherein the rear surface of the glass cover is connected to the housing, and
wherein the bezels disposed only at the top end and the bottom end of the housing have a highest point with respect to the rear surface of the glass cover that is higher than a highest point of the front surface of the glass cover with respect to the rear surface of the glass cover.

2. The handheld electronic product according to claim 1, wherein four corners of the housing have bezels, and wherein the bezels of the top end and the bottom end joins with the bezels provided at the four corners.

3. The handheld electronic product according to claim 2, wherein the four corners of the housing are arc chamfers, wherein the bezels provided at the four corners of the housing are arc bezels, and wherein a height of the bezels provided at the four corners gradually increases from the bottom, at which an arc chamfer joins with a left side of the housing and a right side of the housing to a middle point of the arc chamfer so that the height reaches its peak at the middle point.

4. The handheld electronic product according to claim 3, wherein a left side of the glass cover and a right side of the glass cover separately retract into the housing by 0.1 millimeter (mm) to 0.5 mm.

5. The handheld electronic product according to claim 4, wherein a highest point of the bezels of the housing is 0.1 mm to 0.3 mm higher than the glass cover.

6. The handheld electronic product according to claim 5, further comprising a gap of 0.02 mm to 0.2 mm between the bezels of the housing and the glass cover.

7. A mobile phone, comprising:
a glass cover having a front surface and a rear surface; and
a housing comprising a top end and a bottom end,
wherein the housing is a square housing,
wherein four corners of the housing are provided with bezels,
wherein the bezels are disposed only at the top end and the bottom end of the housing,
wherein the glass cover is built into the housing in a retracted manner,
wherein the rear surface of the glass cover is connected to the housing, and
wherein the bezels disposed only at the top end and the bottom end of the housing have a highest point with respect to the rear surface of the glass cover that is higher than a highest point of the front surface of the glass cover with respect to the rear surface of the glass cover.

8. The mobile phone according to claim 7, wherein four corners the housing have bezels, and wherein the bezels of the top end and the bottom end joins with the bezels provided at the four corners.

9. The mobile phone according to claim 8, wherein the four corners of the housing are arc chamfers, wherein the bezels provided at the four corners of the housing are arc bezels, and wherein a height of the bezels provided at the four corners gradually increases from the bottom, at which an arc chamfer joins with a left side of the housing and a right side of the housing to a middle point of the arc chamfer so that the height reaches its peak at the middle point.

10. The mobile phone according to claim 9, wherein a left side of the glass cover and a right side of the glass cover separately retract into the housing by 0.1 millimeter (mm) to 0.5 mm.

11. The mobile phone according claim 10, wherein a highest point of the bezels of the housing is 0.1 mm to 0.3 mm higher than the glass cover.

12. The mobile phone according to claim 11, further comprising a gap of 0.02 mm to 0.2 mm between the bezels of the housing and the glass cover.

13. An apparatus, comprising:
a glass cover having a front surface and a rear surface; and
a housing comprising a top end and a bottom end,
wherein four corners of the housing are provided with bezels,
wherein the bezels are disposed only, at the top end and the bottom end of the housing,
wherein the glass cover is built into the housing in a retracted manner,
wherein the rear surface of the glass cover is connected to the housing, and
wherein the bezels disposed only at the top end and the bottom end of the housing have a highest point with respect to the rear surface of the glass cover that is higher than a highest point of the front surface of the glass cover with respect to the rear surface of the glass cover.

14. The apparatus according to claim 13, wherein the housing comprises four corners, and wherein the bezels are further disposed only at the four corners, top end, and bottom end of the housing.

15. The apparatus according to claim 14, wherein the bezels at the four corners of the housing are arched.

16. The apparatus according to claim 13, wherein a rear surface of the glass surface is bonded to the housing.

17. The apparatus according to claim 13, wherein the glass surface is built into an upper surface of the housing, and wherein a battery cover is connecting to lower surface of the housing.

18. The apparatus according to claim 13, wherein the bezels are integrally molded into the housing.

19. The apparatus according to claim 13, wherein a left side of the housing and a right side of the housing are not surrounded by the bezels of the housing.

\* \* \* \* \*